US012220914B2

(12) United States Patent
Watanabe

(10) Patent No.: US 12,220,914 B2
(45) Date of Patent: Feb. 11, 2025

(54) LIQUID DISCHARGE HEAD, LIQUID DISCHARGE DEVICE, AND LIQUID DISCHARGE APPARATUS

(71) Applicant: Yu Watanabe, Kanagawa (JP)

(72) Inventor: Yu Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 197 days.

(21) Appl. No.: 18/106,512

(22) Filed: Feb. 7, 2023

(65) Prior Publication Data

US 2023/0249453 A1 Aug. 10, 2023

(30) Foreign Application Priority Data

Feb. 7, 2022 (JP) ................................ 2022-017317

(51) Int. Cl.
*B41J 2/045* (2006.01)
*B41J 2/14* (2006.01)

(52) U.S. Cl.
CPC ....... *B41J 2/04563* (2013.01); *B41J 2/04581* (2013.01)

(58) Field of Classification Search
CPC ......................... B41J 2/04563; B41J 2/04581; B41J 2/14024; B41J 2/104032
See application file for complete search history.

(56) References Cited

U.S. PATENT DOCUMENTS

2005/0190232 A1* 9/2005 Lee .......................... B41J 2/161 347/45
2013/0162708 A1* 6/2013 Hanagami ................ B41J 2/072 347/10
2017/0100934 A1* 4/2017 Masuda ................. B41J 2/1623

FOREIGN PATENT DOCUMENTS

JP 2021-084372 6/2021

* cited by examiner

*Primary Examiner* — Jason S Uhlenhake
(74) *Attorney, Agent, or Firm* — XSENSUS LLP

(57) ABSTRACT

A liquid discharge head includes an actuator substrate including a pressure chamber communicating with a nozzle from which a liquid is to be discharged and a pressure generator to apply pressure to the liquid in the pressure chamber, a frame bonded to the actuator substrate and having a through hole filled with a resin, and a temperature detector inserted into the through hole and attached to the actuator substrate with the resin to detect a temperature of the actuator substrate. The through hole has a first face facing the actuator substrate and a second face opposite to the first face and facing an opening of the frame. The resin in the through hole includes an uncured portion uncured and facing the first face and a cured portion cured and facing the second face. The uncured portion contacts the actuator substrate and is between the cured portion and the actuator substrate.

11 Claims, 11 Drawing Sheets

COMPARATIVE EXAMPLE

LIQUID DISCHARGE HEAD, LIQUID DISCHARGE DEVICE, AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-017317, filed on Feb. 7, 2022, in the Japan Patent Office, the entire disclosure of which is hereby incorporated by reference herein.

BACKGROUND

Technical Field

Embodiments of the present disclosure relate to a liquid discharge head, a liquid discharge device, and a liquid discharge apparatus.

Related Art

In the related art, a liquid discharge head includes a pressure chamber communicating with a nozzle from which a liquid is discharged, a pressure chamber actuator substrate including a pressure generator that applies pressure to the liquid in the pressure chamber, a frame holding the pressure chamber actuator substrate, and a temperature detector that detects a temperature of the pressure chamber actuator substrate.

SUMMARY

Embodiments of the present disclosure describe an improved liquid discharge head that includes an actuator substrate, a frame, and a temperature detector. The actuator substrate includes a pressure chamber communicating with a nozzle from which a liquid is to be discharged and a pressure generator to apply pressure to the liquid in the pressure chamber. The frame is bonded to the actuator substrate and has a through hole filled with a resin. The temperature detector is inserted into the through hole and attached to the actuator substrate with the resin to detect a temperature of the actuator substrate. The through hole has a first face facing the actuator substrate and a second face opposite to the first face and facing an opening of the frame. The resin in the through hole includes an uncured portion uncured and facing the first face of the through hole and a cured portion cured and facing the second face of the through hole. The uncured portion contacts the actuator substrate and is disposed between the cured portion and the actuator substrate.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
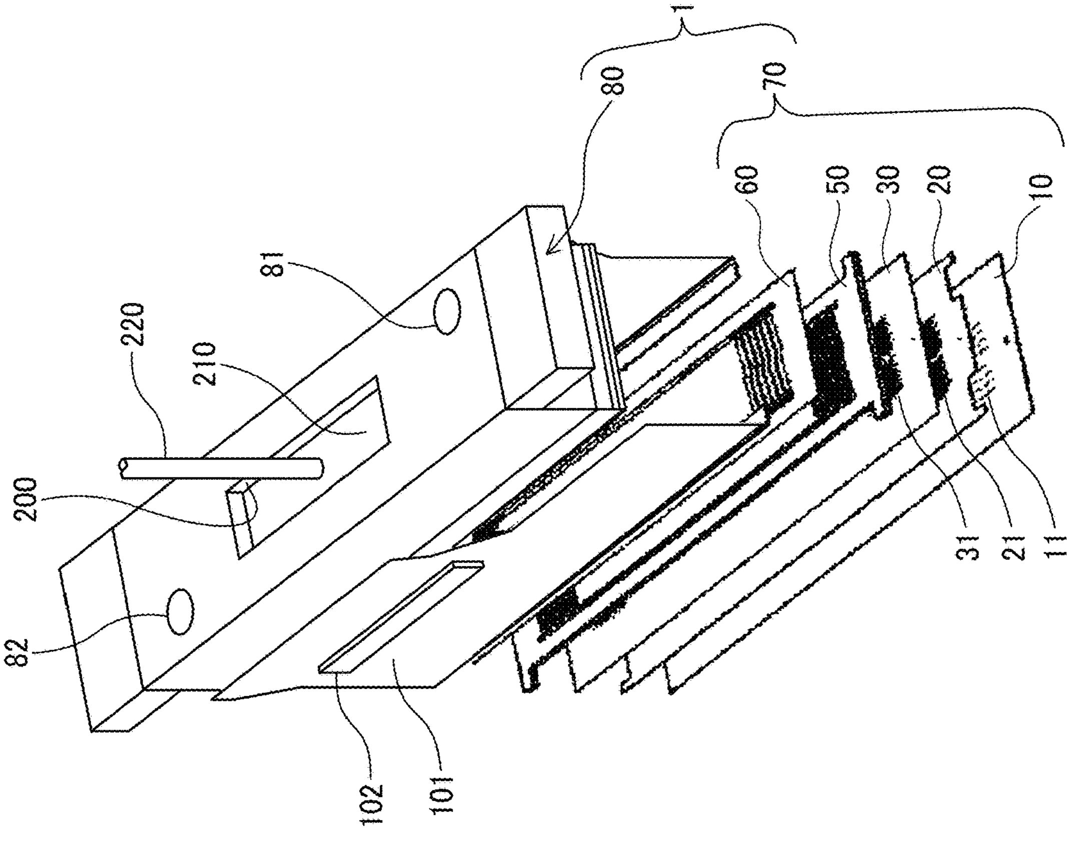
FIG. 1 is an exploded perspective view of a liquid discharge head according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a." "an," and "the" are intended to include the plural forms as well, unless the context clearly indicates otherwise.

Figure 2:
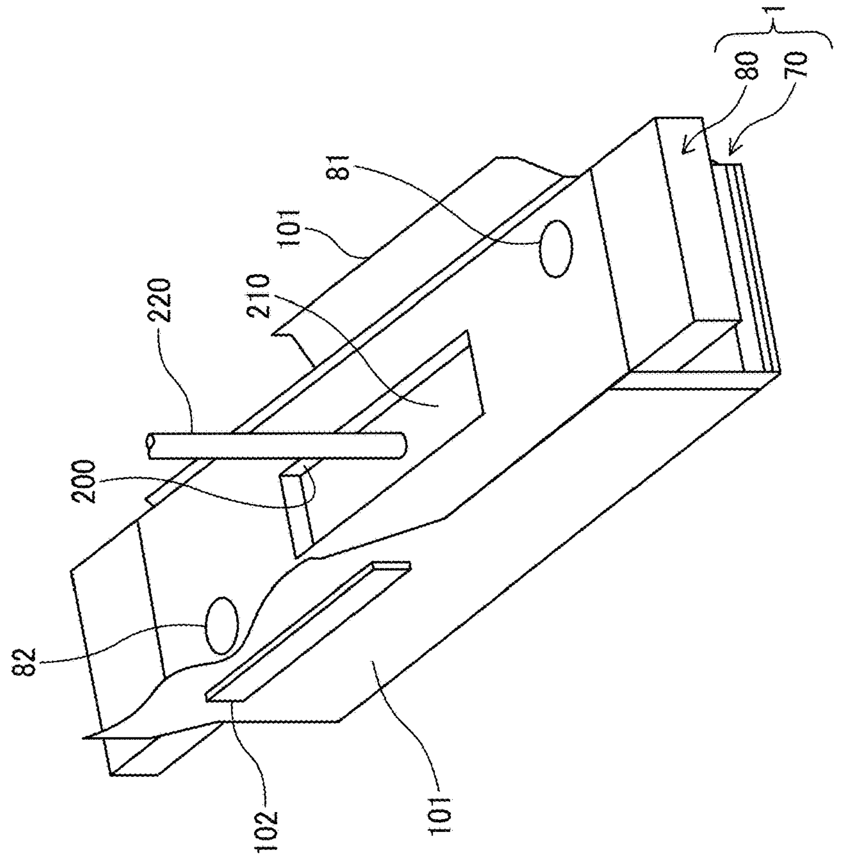
FIG. 2 is an outer perspective view of the liquid discharge head according to the present embodiment.

A description is given below of a liquid discharge head installed in a liquid discharge apparatus according to an embodiment of the present disclosure. FIG. 1 is an exploded perspective view of a liquid discharge head 1 according to the present embodiment. FIG. 2 is an outer perspective view of the liquid discharge head 1.

The liquid discharge head 1 includes a nozzle plate 10, an individual channel substrate 20 (channel plate), a diaphragm substrate 30, a common channel substrate 50, a damper 60, a frame 80, and a flexible wiring board 101 mounting a drive circuit 102. Each of the nozzle plate 10 as a nozzle substrate, the individual channel substrate 20, the diaphragm substrate 30, the common channel substrate 50 as a sub-frame substrate, and the damper 60 as a damper substrate uses a single-crystal silicon (Si) wafer as a substrate material. A plurality of chips (substrates for the liquid discharge head 1) is simultaneously formed on the Si wafer by a microfabrication technique for micro electro mechanical systems (MEMS) or a semiconductor device, and the chipped substrates are bonded to each other, thereby constructing an actuator substrate 70. The actuator substrate 70 is bonded to and held by the frame 80.

The nozzle plate 10 has multiple nozzles 11 from which a liquid is to be discharged. The individual channel substrate 20 defines multiple pressure chambers 21 (individual liquid chambers) respectively communicating with the multiple nozzles 11, multiple individual supply channels respectively communicating with the multiple pressure chambers 21, and multiple individual collection channels respectively communicating with the multiple pressure chambers 21. One pressure chamber 21 and the individual supply channel and the individual collection channel communicating with the one pressure chamber 21 are collectively referred to as an individual channel.

The diaphragm substrate 30 forms a diaphragm serving as a deformable wall of the pressure chamber 21, and multiple piezoelectric elements 31 are integrally attached to the diaphragm. Further, the diaphragm substrate 30 has a supply-side opening that communicates with the individual supply channel and a collection-side opening that communicates with the individual collection channel. The piezoelectric element 31 is a pressure generator such as an electromechanical transducer element to deform the diaphragm to apply pressure to the liquid in the pressure chamber 21.

Note that the individual channel substrate 20 and the diaphragm substrate 30 are not limited to be separate components. For example, the individual channel substrate 20 and the diaphragm substrate 30 may be integrally formed as a single body using a silicon on insulator (SOI) substrate. That is, the SOI substrate in which a silicon oxide film, a silicon layer, and a silicon oxide film are formed in this order on a silicon substrate can be used. The silicon substrate serves as the individual channel substrate 20, and the silicon oxide film, the silicon layer, and the silicon oxide film construct the diaphragm. In such a configuration, the layer structure of the silicon oxide film, the silicon layer, and the silicon oxide film in the SOI substrate serve as the diaphragm substrate 30. Thus, the diaphragm substrate 30 may be formed of materials formed as films on a surface of the individual channel substrate 20.

The damper 60 includes a supply-side damper that faces (opposes) a supply port of a common-supply branch channel and a collection-side damper that faces (opposes) a collection port of a common-collection branch channel. The damper substrate having a surface of the damper 60 bonded to the frame 80 is the silicon substrate.

The frame 80 has a channel communicating with a common supply channel of the common channel substrate 50. The channel penetrates the frame 80 in the vertical direction in FIG. 1, and an upper opening of the channel serves as a supply port 81. The frame 80 further has another channel communicating with a common collection channel of the common channel substrate 50. The channel penetrates the frame 80 in the vertical direction in FIG. 1, and an upper opening of the channel serves as a collection port 82. The frame 80 further has a through hole 200 penetrating the frame 80 in the vertical direction up to the upper surface of the damper 60 in FIG. 1. The through hole 200 is filled with an adhesive resin 210 (also simply referred to as a resin) in a state where a temperature detector 220, which includes a temperature measuring device 221 and a signal line 222 extending from the temperature measuring device 221, is inserted in the through hole 200 to secure the temperature detector 220 (the temperature measuring device 221) at a position adjacent to the actuator substrates 70. In other words, the temperature detector 220 is inserted into the through hole 200 and attached to the actuator substrate 70 with the adhesive resin 210.

Figure 3A:
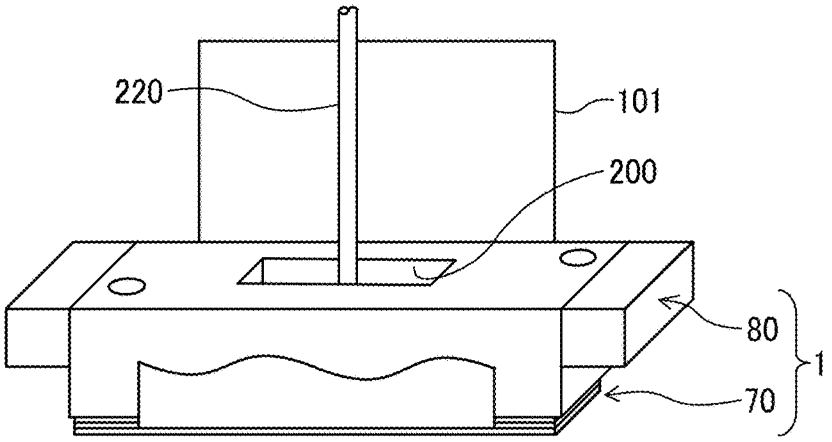
FIGS. 3A to 3C are schematic views of the liquid discharge head to which a temperature detector is secured according to the present embodiment.
Figure 3B:
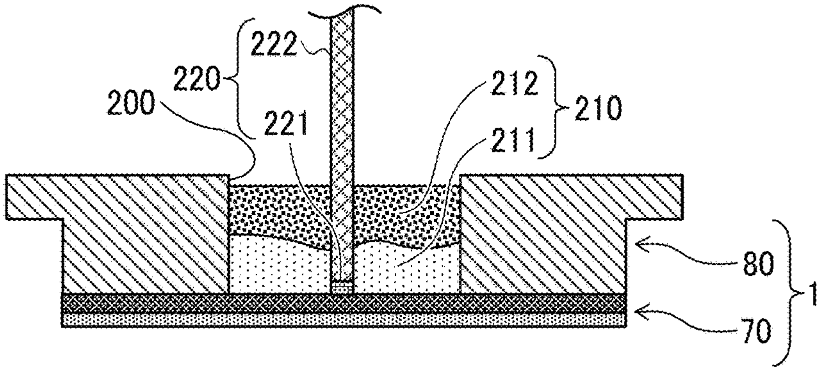
Figure 3C:
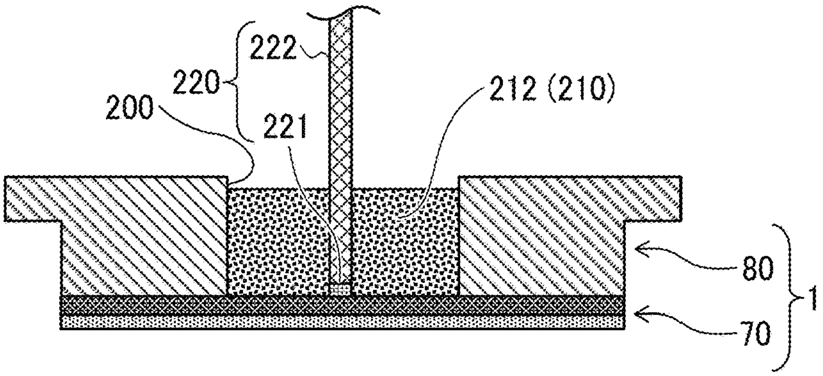

FIGS. 3A to 3C are schematic views of the liquid discharge head 1 to which the temperature detector 220 is secured. FIG. 3A is a perspective view of the liquid discharge head 1 when the temperature measuring device 221 of the temperature detector 220 (see FIG. 3B) is inserted into the through hole 200. FIG. 3B is a schematic view of the liquid discharge head 1 in which the through hole 200 is filled with the adhesive resin 210 to secure the temperature detector 220 according to the present embodiment. FIG. 3C is a schematic view of the liquid discharge head 1 according to a comparative example.

In the comparative example illustrated in FIG. 3C, for example, an ultraviolet (UV) curable resin is used as the adhesive resin 210. The through hole 200 is filled with the adhesive resin 210, and an upper surface of the adhesive resin 210 is irradiated with ultraviolet (UV) rays from above in FIG. 3C, thereby curing the entire adhesive resin 210. Such a structure to secure the temperature detector 220 according to the comparative example may deteriorate the liquid discharging performance of the liquid discharge head 1 as follows. In this structure, the temperature measuring device 221 is directly attached to the actuator substrate 70, which is a core component, with the adhesive resin 210. Accordingly, a stress is applied to the core component (i.e., the actuator substrate 70) due to cure shrinkage of the adhesive resin 210 when the temperature measuring device 221 is secured, or due to a difference in linear expansion between the core component and surrounding components caused by temperature rise when the liquid discharge head 1 is transported or stored under a high temperature environment. Due to this stress, the rigidity of the diaphragm of the diaphragm substrate 30 of the actuator substrate 70 may change, thereby changing discharge properties. As a result, the liquid discharging performance of the liquid discharge head 1 may be deteriorated.

In the liquid discharge head 1 according to the present embodiment, as illustrated in FIG. 3B, the through hole 200 is filled with the adhesive resin 210 to secure the temperature detector 220. The adhesive resin 210 has an uncured portion 211 that is uncured and a cured portion 212 that is cured. The uncured portion 211 is disposed in the actuator substrate 70 side of the through hole 200 and contacts the actuator substrate 70. The cured portion 212 is disposed in an open side of the through hole 200 (or a surface side of the adhesive resin 210).

In other words, the through hole 200 has a first face facing the actuator substrate 70 and a second face opposite to the first face and facing an opening of the frame 80. The adhesive resin 210 in the through hole 200 includes the uncured portion 211 uncured and facing the first face of the through hole 200 and the cured portion 212 cured and facing the second face of the through hole 200. The uncured portion 211 contacts the actuator substrate 70 and is disposed between the cured portion 212 and the actuator substrate 70.

With this configuration, since a portion of the adhesive resin 210 contacting the actuator substrate 70 (i.e., the uncured portion 211) has not been hardened, the stress due to the cure shrinkage of the adhesive resin 210 and the expansion and contraction of the components caused by the thermal stress during transportation is not transmitted to the pressure chamber 21, thereby preventing the cured portion 212 of the adhesive resin 210 from affecting the discharge properties.

When the UV curable resin having poor UV transmittance is used as the adhesive resin 210, the UV rays reach only to a certain depth of the adhesive resin 210, and the adhesive resin 210 is cured only to the certain depth. The UV curable resin is cured from the surface irradiated with the UV rays, and the UV transmittance of the adhesive resin 210 decreases with an increase in the depth. Accordingly, the irradiation time of the UV rays is adjusted to cure the adhesive resin 210 to a desired depth. As a result, the cured portion of the adhesive resin 210 (i.e., the cured portion 212) on the surface side (i.e., the open side of the through hole 200) seals the uncured portion of the adhesive resin 210 (i.e., the uncured portion 211) on the actuator substrate 70 side, thereby maintaining the uncured portion 211 uncured and flowable (having a fluidity) even when the liquid discharge head 1 is used in the liquid discharge apparatus. Even if the adhesive resin 210 needs moisture or oxygen in the air to be cured in addition to the UV rays, the cured portion of the adhesive resin 210 (i.e., the cured portion 212) on the surface side can block the moisture or the like.

In other words, the adhesive resin 210, which secures the temperature detector 220 as illustrated in FIG. 3B, has the uncured portion 211 in the actuator substrate 70 side of the through hole 200 and the cured portion 212 in the open side of the through hole 200. The uncured portion 211 contacts the actuator substrate 70 and has a first fluidity, and the cured portion 212 has a second fluidity smaller than the first fluidity. Note that the second fluidity includes no fluidity, that is, the cured portion 212 is not flowable In further other words, the adhesive resin 210 has the uncured portion 211 in the actuator substrate 70 side of the through hole 200 and the cured portion 212 in the open side of the through hole 200. The uncured portion 211 contacts the actuator substrate 70 and has a first hardness, and the second portion has a second hardness higher than the first hardness. This is because the cured resin has a higher hardness than the uncured resin.

Figure 4:
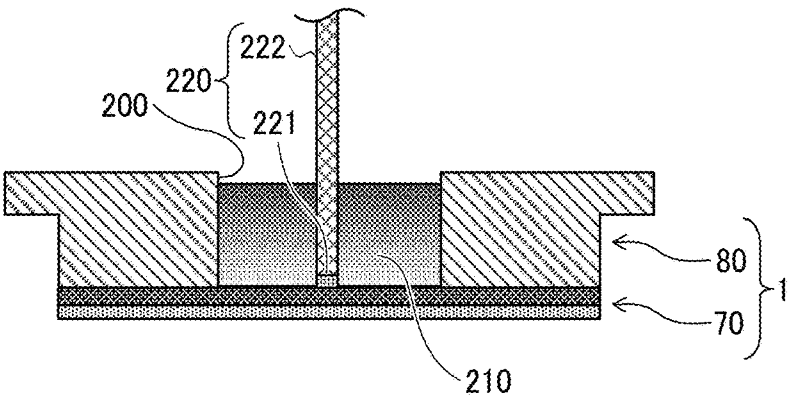
FIG. 4 is a schematic view of the liquid discharge head to which the temperature detector is secured according to a modification of the present disclosure.

FIG. 4 is a schematic view of the liquid discharge head 1 to which the temperature detector 220 is secured according to a modification of the present embodiment. In the modification illustrated in FIG. 4, the hardness of the adhesive resin 210 gradually increases from the actuator substrate 70 side toward the surface side. In FIG. 4, the change in hardness is indicated by brightness of hatch pattern corresponding to the adhesive resin 210.

Figure 5A:
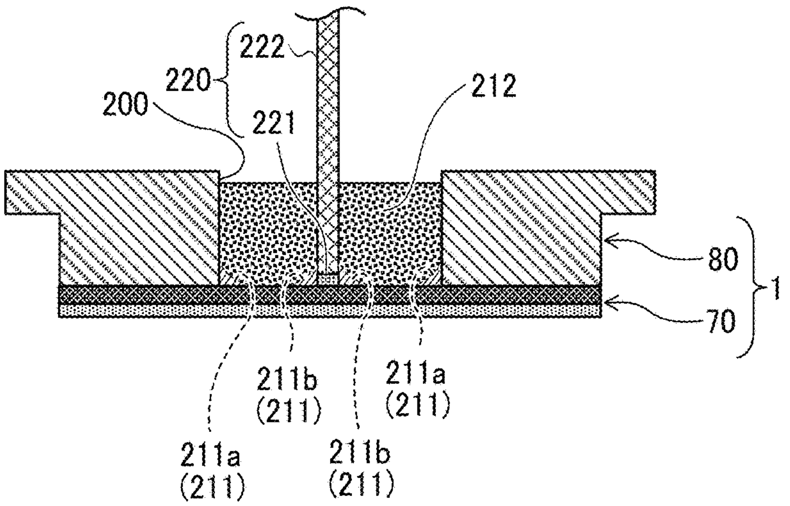
FIGS. 5A and 5B are schematic views of the liquid discharge head to which the temperature detector is secured according to another modification of the present embodiment.
Figure 5B:
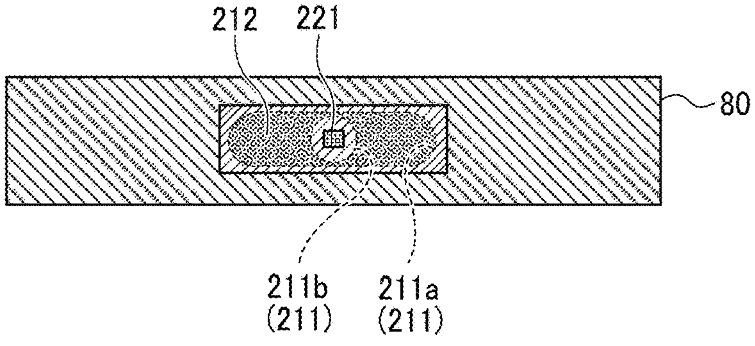

FIGS. 5A and 5B are schematic views of the liquid discharge head 1 to which the temperature detector 220 is secured according to another modification of the present embodiment. FIG. 5A is a cross-sectional view of the liquid discharge head 1, and FIG. 5B is a plan view of the liquid discharge head 1. In this modification, the uncured portion 211, which contacts the actuator substrate 70, includes a first portion enclosing the temperature measuring device 221 (a hatched area inside a broken line 211*b* in FIG. 5B). As described above, the uncured portion 211 is uncured, has the first fluidity, or has the first hardness. In addition, the uncured portion 211, which contacts the actuator substrate 70, includes a second portion contacting a surface of the actuator substrate 70 and an inner periphery of the through hole 200 adjacent to the surface of the actuator substrate 70 (a hatched area outside a broken line 211*a* in FIG. 5B).

If the uncured portion 211 of the adhesive resin 210 described above, which is indicated by the broken lines 211*a* and 211*b*, is cured, a strong stress is applied to the actuator substrate 70, thereby affecting the discharge properties of the liquid discharge head 1. If the uncured portion 211 is uncured as described above, the discharge properties are less likely to be affected.

Figure 6:
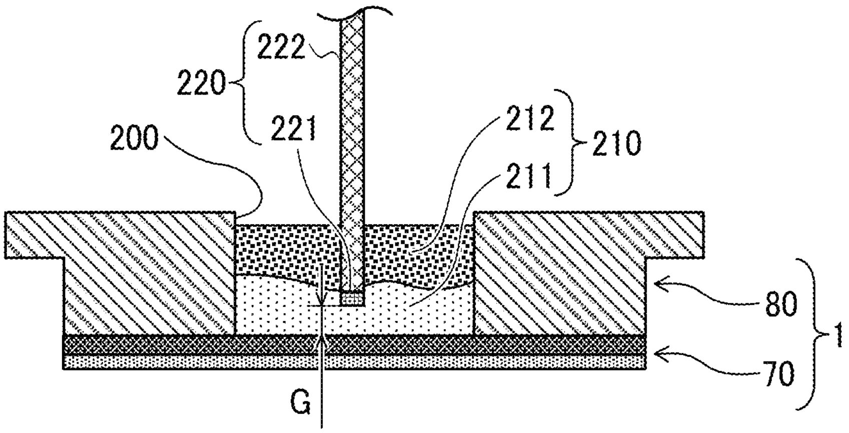
FIG. 6 is a schematic view of the liquid discharge head illustrating a distance between the temperature detector and an actuator substrate.

FIG. 6 is a schematic view of the liquid discharge head 1 illustrating a distance G between the temperature measuring device 221, which is disposed at a leading end of the temperature detector 220, and the actuator substrate 70 in each of the above embodiments. The distance G is illustrated in FIG. 6, which is the same embodiment illustrated in FIG. 3B except for the position of the temperature measuring device 221. The distance G is preferably set within a range of 0 to 2 mm. The temperature of the liquid such as ink (the temperature of the actuator substrate 70) can be correctly measured when the distance G is within the range of 0 to 2 mm. If the distance G is within the range of 0 to 2 mm and the temperature measuring device 221 is not pressed against the actuator substrate 70, no stress is applied to the actuator substrate 70, thereby not affecting the liquid discharging performance.

Figure 7:
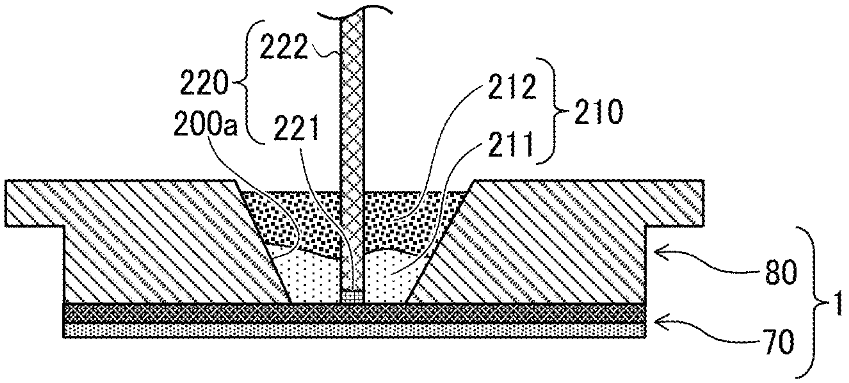
FIG. 7 is a schematic view of the liquid discharge head illustrating a variation of a periphery of a through hole.

FIG. 7 is a schematic view of the liquid discharge head 1 illustrating a variation of a periphery 200*a* of the through hole 200 in each of the above embodiments. The liquid discharge head 1 illustrated in FIG. 7 corresponds to the same embodiment illustrated in FIG. 3 except for the shape of the through hole 200. The periphery 200*a* of the through hole 200 has a tapered cross section, a diameter of which decreases toward the actuator substrate 70. Since the adhesive area between the adhesive resin 210 and the actuator substrate 70 is reduced, the stress applied to the actuator substrate 70 can be reduced, thereby less affecting the discharge properties. As a result, the liquid discharging performance of the liquid discharge head 1 can be maintained.

The actuator substrate 70 preferably includes the silicon substrate facing the frame 80. Specifically, most of laminated substrates constructing the actuator substrate 70 on the frame 80 side is more preferably formed of the silicon substrate. The amount of deformation of the silicon substrate is small, and the stress due to the curing of the adhesive resin 210 is less likely to be transmitted to the actuator substrate 70. As a result, the liquid discharging performance of the liquid discharge head 1 can be maintained.

Figure 8:
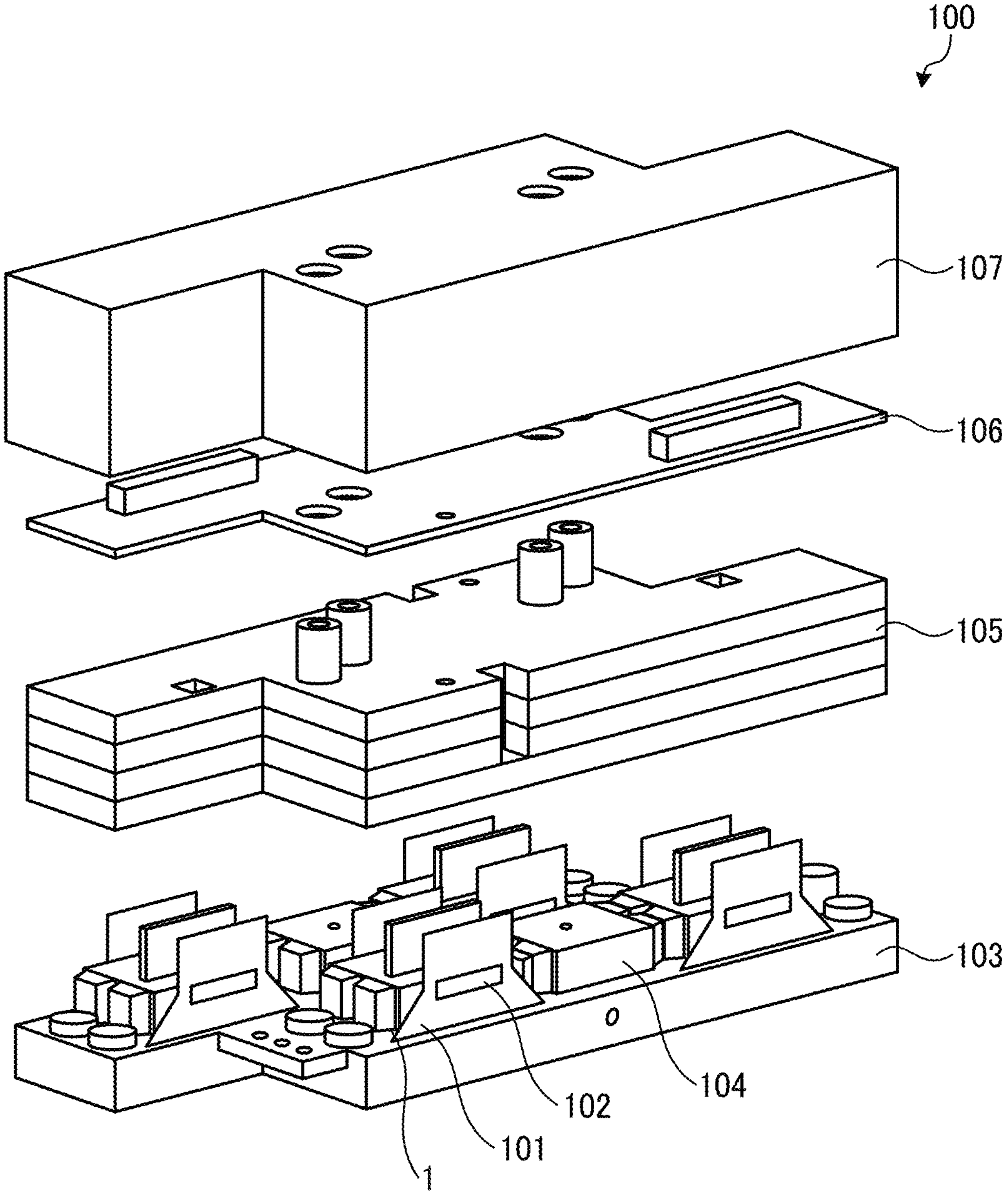
FIG. 8 is an exploded perspective view of a head module according to the present embodiment.
Figure 9:
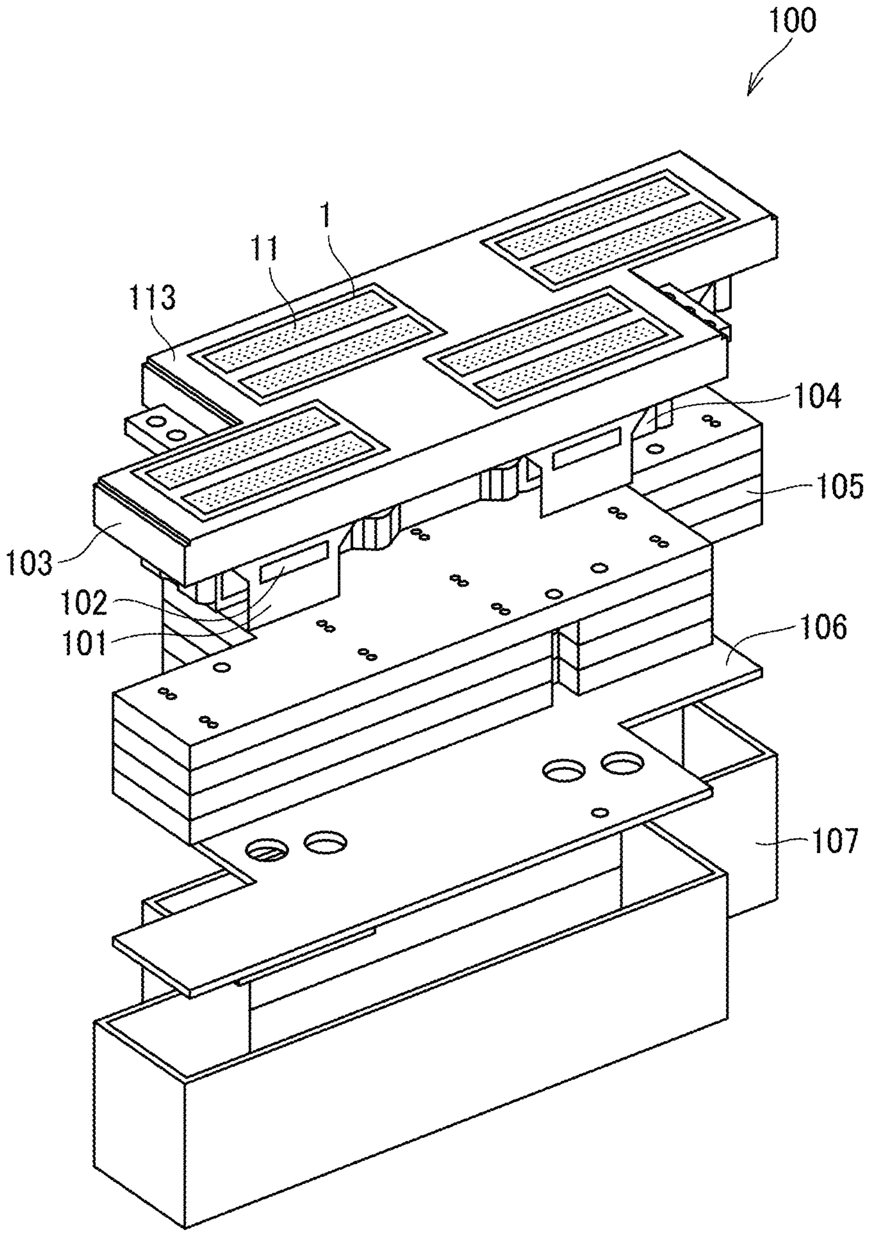
FIG. 9 is an exploded perspective view of the head module according to the present embodiment as viewed from a nozzle face side thereof.

Next, an example of a head module 100 including the liquid discharge head 1 according to the present embodiment is described with reference to FIGS. 8 and 9. FIG. 8 is an exploded perspective view of the head module 100 according to the present embodiment. FIG. 9 is an exploded perspective view of the head module 100 according to the present embodiment as viewed from a nozzle face side thereof.

The head module 100 includes the multiple liquid discharge heads 1 (hereinafter, also simply referred to as the head) that discharge a liquid, a base 103 that holds the multiple liquid discharge heads 1, a cover 113 serving as a nozzle cover that covers the multiple nozzles 11 of the multiple liquid discharge heads 1. The head module 100 further includes a heat dissipator 104, a manifold 105 defining channels to supply a liquid to the multiple liquid discharge heads 1, a printed circuit board (PCB) 106 coupled to the flexible wiring board 101, and a module case 107.

Figure 10:
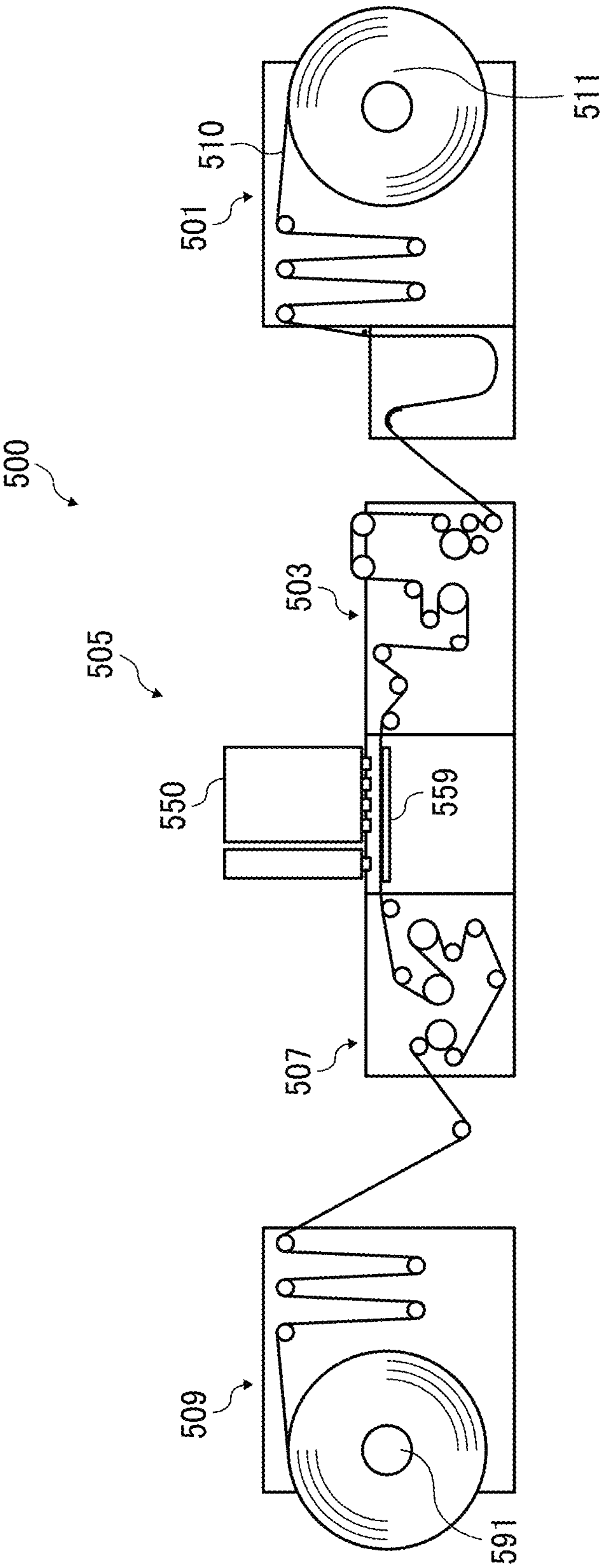
FIG. 10 is a schematic view of a printer according to the present embodiment.
Figure 11:
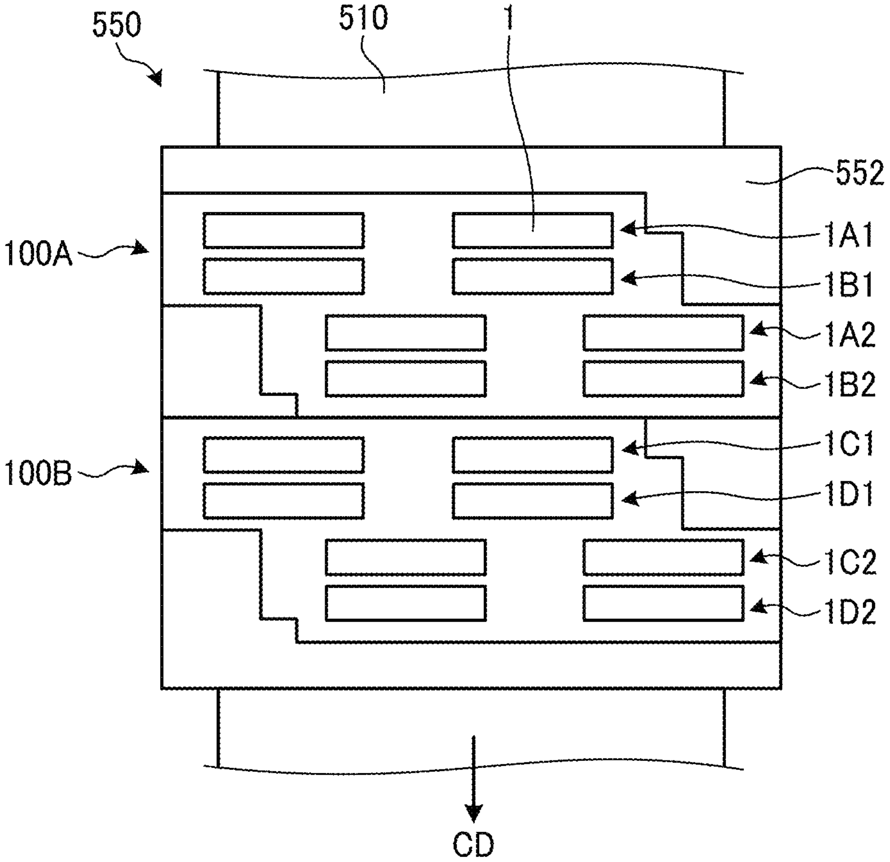
FIG. 11 is a plan view of an example of a head unit of the printer illustrated in FIG. 10.

Next, an example of a liquid discharge apparatus according to the present embodiment is described with reference to FIGS. 10 and 11. FIG. 10 is a schematic side view of a printer 500, which is an inkjet recording apparatus as the liquid discharge apparatus according to the present embodiment. FIG. 11 is a plan view of an example of a head unit 550 of the printer 500 according to the present embodiment.

The printer 500 serving as the liquid discharge apparatus includes a feeder 501 to feed a continuous medium 510, such as a rolled sheet, a guide conveyor 503 to guide and convey the continuous medium 510, fed from the feeder 501, to a printing unit 505, the printing unit 505 to discharge a liquid onto the continuous medium 510 to form an image on the continuous medium 510, a dryer 507 to dry the continuous medium 510, and a carrier 509 to feeds the dried continuous medium 510 outward.

The continuous medium 510 is fed from a winding roller 511 of the feeder 501, guided and conveyed with rollers of the feeder 501, the guide conveyor 503, the dryer 507, and the carrier 509, and wound around a take-up roller 591 of the carrier 509. In the printing unit 505, the continuous medium 510 is conveyed on a conveyance guide 559 so as to face the head unit 550. The head unit 550 discharges a liquid onto the continuous medium 510 to form an image.

In the printer 500 according to the present embodiment, the head unit 550 includes the two head modules 100A and 100B according to the present embodiment on a common base 552. The head module 100A includes head arrays 1A1, 1B1, 1A2, and 1B2. Each of the head arrays 1A1, 1B1, 1A2, and 1B2 includes multiple liquid discharge heads 1 arranged in a head array direction perpendicular to a conveyance direction of the sheet P indicated by arrow CD in FIG. 11. The head module 100B includes head arrays 1C1, 1D1, 1C2, and 1D2. Each of the head arrays 1C1, 1D1, 1C2, and 1D2 includes multiple liquid discharge heads 1 arranged in the head array direction perpendicular to the conveyance direction of the sheet P. The head arrays 1A1 and 1A2 of the head module 100A discharge a liquid of the same color. Similarly, the head arrays 1B1 and 1B2 of the head module 100A are grouped as one set and discharge a liquid of the same desired color. The head arrays 1C1 and 1C2 of the head module 100B are grouped as one set and discharge a liquid of the same desired color. The head arrays 1D1 and 1D2 of the head module 100B are grouped as one set and discharge a liquid of the same desired color.

Figure 12:
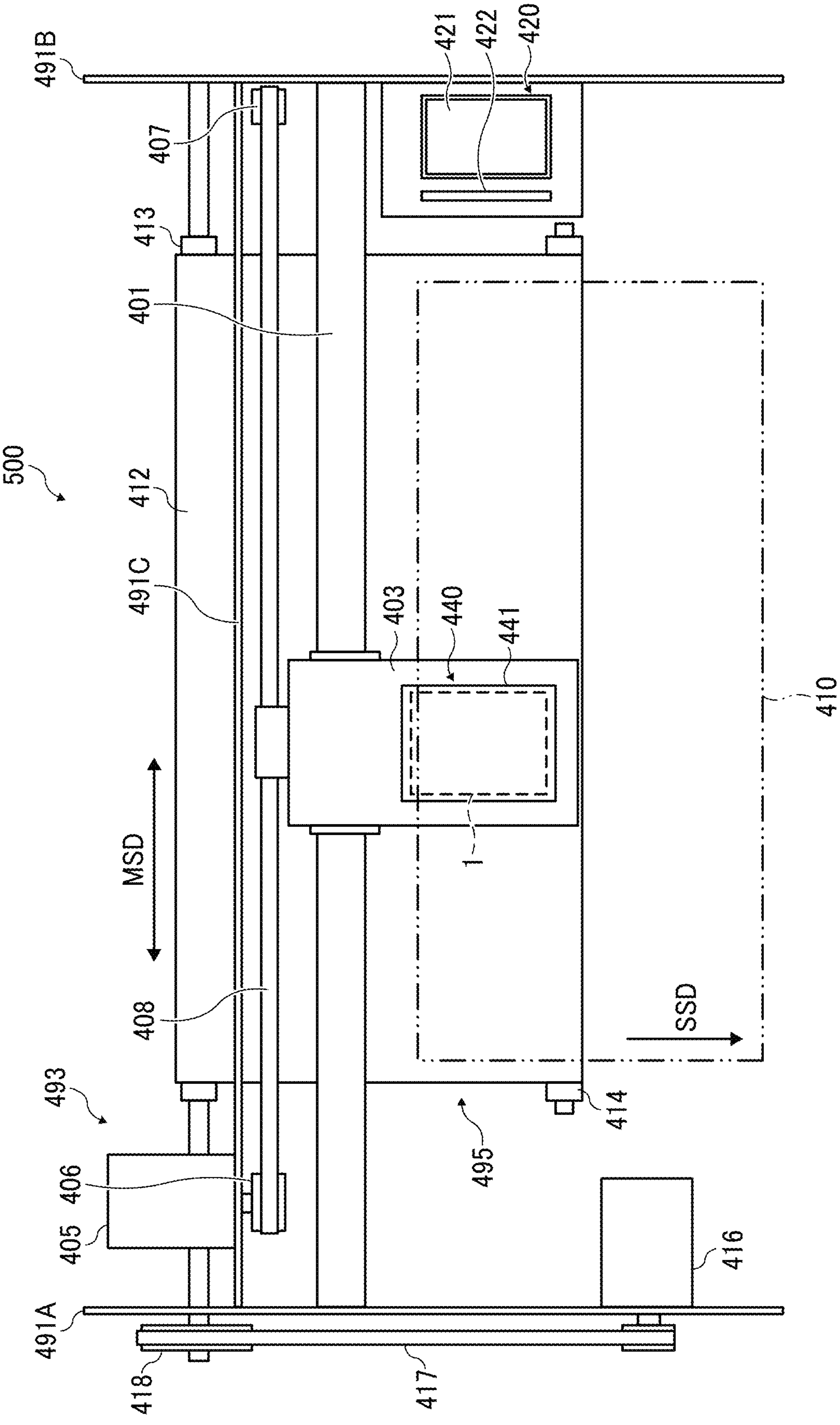
FIG. 12 is a plan view of a part of the printer according to another example.
Figure 13:
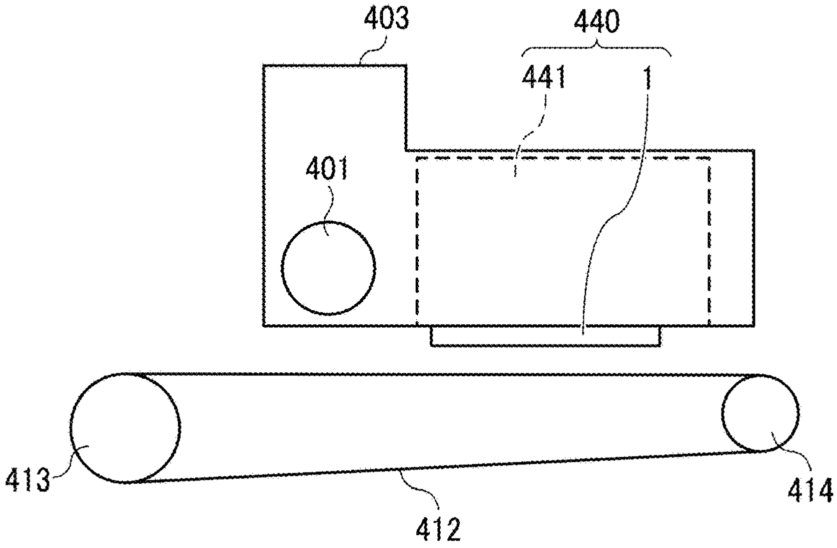
FIG. 13 is a side view of the part of the printer illustrated in FIG. 12.

Next, another example of the printer 500 as the liquid discharge apparatus according to the present embodiment is described with reference to FIGS. 12 and 13. FIG. 12 is a plan view of a part of the printer 500 according to another example. FIG. 13 is a side view of the part of the printer 500 in FIG. 12.

In this example, the printer 500 is a serial type apparatus, and a main-scanning moving mechanism 493 reciprocally moves a carriage 403 in a main scanning direction indicated by arrow MSD in FIG. 12. The main-scanning moving mechanism 493 includes a guide 401, a main-scanning motor 405, and a timing belt 408. The guide 401 is bridged between left and right side plates 491A and 491B to moveably hold the carriage 403. The main-scanning motor 405 reciprocates the carriage 403 in the main scanning direction via the timing belt 408 looped around a drive pulley 406 and a driven pulley 407.

The carriage 403 carries a liquid discharge device 440 including the liquid discharge head 1 according to the present embodiment and a head tank 441 as a single integrated unit. The liquid discharge head 1 of the liquid discharge device 440 discharges color liquid of, for example, yellow (Y), cyan (C), magenta (M), and black (K). The liquid discharge head 1 is mounted on the liquid discharge device 440 such that a nozzle row including the multiple nozzles 11 is arranged in a sub-scanning direction perpendicular to the main scanning direction. The liquid discharge head 1 discharges the color liquid downward from the multiple nozzles 11. The liquid discharge head 1 is coupled to a liquid circulation device so that a liquid of a desired color is circulated and supplied.

The printer 500 includes a conveyance mechanism 495 to convey a sheet 410. The conveyance mechanism 495 includes a conveyance belt 412 as a conveyor and a sub-scanning motor 416 to drive the conveyance belt 412. The conveyance belt 412 attracts the sheet 410 and conveys the sheet 410 at a position facing the liquid discharge head 1. The conveyance belt 412 is an endless belt stretched between a conveyance roller 413 and a tension roller 414. The sheet 410 can be attracted to the conveyance belt 412 by electrostatic attraction, air suction, or the like. The conveyance belt 412 circumferentially moves in the sub-scanning direction indicated by arrow SSD in FIG. 12 as the conveyance roller 413 is rotationally driven by the sub-scanning motor 416 via a timing belt 417 and a timing pulley 418.

On one side of the carriage 403 in the main scanning direction, a maintenance mechanism 420 that maintains and recovers the liquid discharge head 1 is disposed lateral to the conveyance belt 412. The maintenance mechanism 420 includes, for example, a cap 421 to cap a nozzle face (i.e., a face on which the multiple nozzles 11 are formed) of the liquid discharge head 1 and a wiper 422 to wipe the nozzle face. The main-scanning moving mechanism 493, the maintenance mechanism 420, and the conveyance mechanism 495 are mounted onto a housing including the side plates 491A and 491B and a back plate 491C.

In the printer 500 having the above-described configuration, the sheet 410 is fed and attracted onto the conveyance belt 412 and conveyed in the sub-scanning direction by the circumferential movement of the conveyance belt 412. The liquid discharge head 1 is driven in response to an image signal while moving the carriage 403 in the main scanning direction to discharge a liquid onto the sheet 410 not in motion, thereby forming an image.

Figure 14:
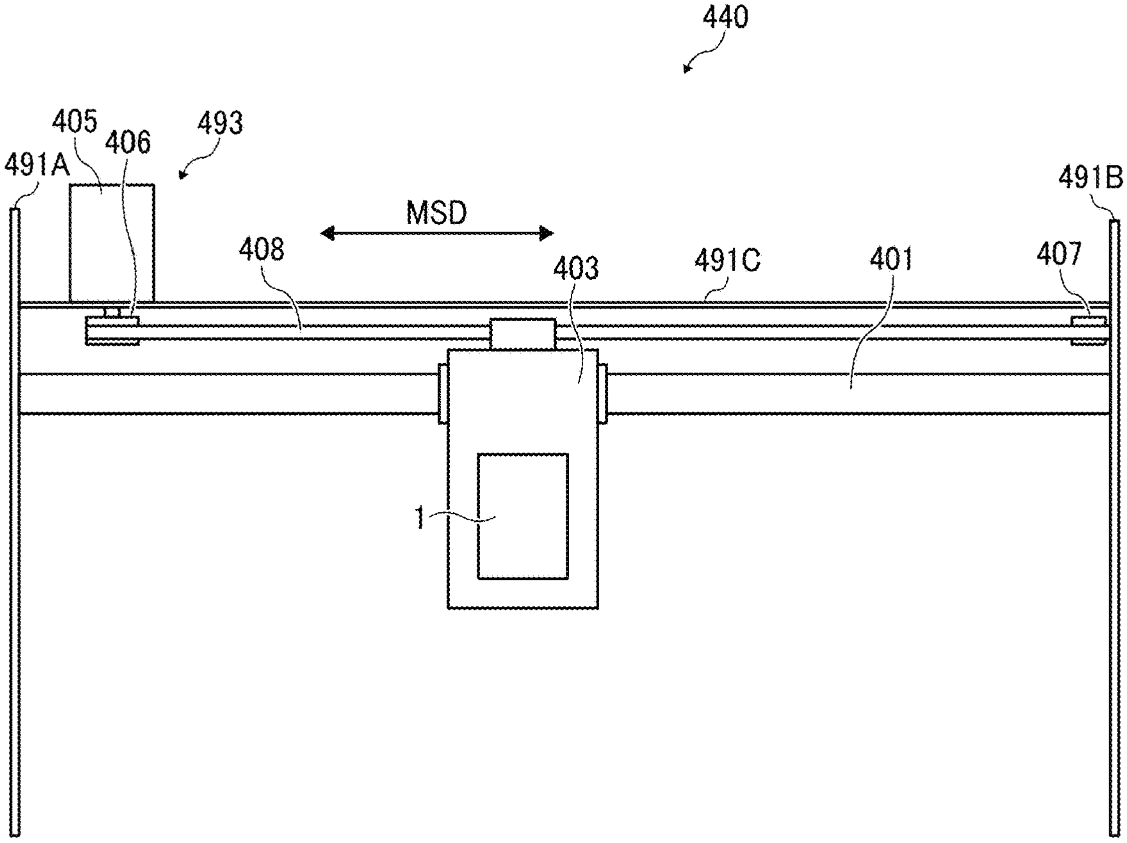
FIG. 14 is a plan view of an example of a liquid discharge device according to the present embodiment.

Next, another example of the liquid discharge device 440 according to the present embodiment is described with reference to FIG. 14. FIG. 14 is a plan view of a part of the liquid discharge device 440 according to the present embodiment. The liquid discharge device 440 includes the housing, the main-scanning moving mechanism 493, the carriage 403, and the liquid discharge head 1 among components of the printer 500 as the liquid discharge apparatus illustrated in FIG. 12. The side plates 491A and 491B, and the back plate 491C construct the housing. Note that, in the liquid discharge device 440, the maintenance mechanism 420 described above may be mounted on, for example, the side plate 491B.

Figure 15:
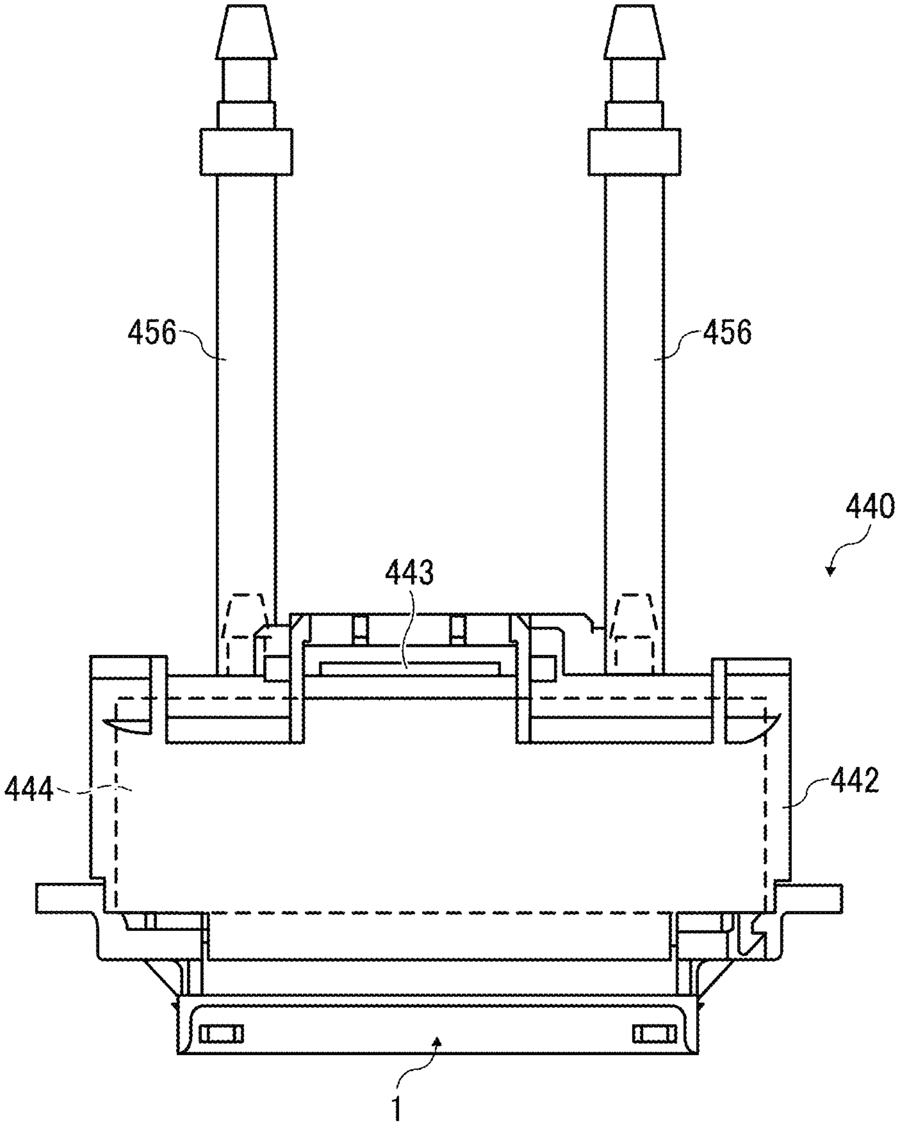
FIG. 15 is a front view of another example of the liquid discharge device according to the present embodiment.

Next, still another example of the liquid discharge device 440 according to the present embodiment is described with reference to FIG. 15. FIG. 15 is a plan view of a part of the liquid discharge device 440. The liquid discharge device 440 includes the liquid discharge head 1 to which a channel component 444 is attached, and a tube 456 connected to the channel component 444. The channel component 444 is disposed inside a cover 442. In some embodiments, the liquid discharge device 440 may include the head tank 441 instead of the channel component 444. A connector 443 for electrically connecting to the liquid discharge head 1 is provided on an upper portion of the channel component 444.

In the present disclosure, the liquid to be discharged is not limited to a particular liquid as long as the liquid has a viscosity or surface tension to be discharged from a head (liquid discharge head). However, preferably, the viscosity of the liquid is not greater than 30 mPa·s under ordinary temperature and ordinary pressure or by heating or cooling. Examples of the liquid include a solution, a suspension, or an emulsion including, for example, a solvent, such as water or an organic solvent, a colorant, such as dye or pigment, a functional material, such as a polymerizable compound, a resin, or a surfactant, a biocompatible material, such as DNA, amino acid, protein, or calcium, and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

Examples of an energy source for generating energy to discharge liquid include a piezoelectric actuator (a laminated piezoelectric element or a thin-film piezoelectric element), a thermal actuator that employs a thermoelectric conversion element, such as a thermal resistor, and an electrostatic actuator including a diaphragm and a counter electrode.

The "liquid discharge device" is an assembly of parts relating to liquid discharge. The term "liquid discharge device" represents a structure including the liquid discharge head and a functional part(s) or unit(s) combined with the liquid discharge head as a single unit. For example, the "liquid discharge device" includes a combination of the liquid discharge head with at least one of a head tank, a carriage, a supply mechanism, a maintenance mechanism, a main-scanning moving mechanism, and a liquid circulation device.

Here, the integrated unit may be, for example, a combination in which the liquid discharge head and a functional part(s) are secured to each other through, e.g., fastening, bonding, or engaging, and a combination in which one of the liquid discharge head and a functional part(s) is movably held by another. The liquid discharge head may be detachably attached to the functional part(s) or unit(s) each other.

For example, the liquid discharge head and the head tank are integrated as the liquid discharge device. Alternatively, the liquid discharge head and the head tank coupled (connected) to each other via a tube or the like may form the liquid discharge device as a single unit. Here, a unit including a filter may further be added to a portion between the head tank and the liquid discharge head of the liquid discharge device.

In another example, the liquid discharge device may be an integrated unit in which a liquid discharge head is integrated with a carriage.

As yet another example, the liquid discharge device is a unit in which the liquid discharge head and the main-scanning moving mechanism are combined into a single unit. The liquid discharge head is movably held by a guide that is a part of the main-scanning moving mechanism. The liquid discharge device may include the liquid discharge head, the carriage, and the main-scanning moving mechanism that are integrated as a single unit.

In another example, the cap that forms a part of the maintenance mechanism is secured to the carriage mounting the liquid discharge head so that the liquid discharge head, the carriage, and the maintenance mechanism are integrated as a single unit to form the liquid discharge device.

Further, in still another example, the liquid discharge device includes tubes connected to the liquid discharge head mounting the head tank or the channel component so that the liquid discharge head and the supply mechanism are integrated as a single unit. Through the tubes, the liquid in a liquid storage source is supplied to the liquid discharge head.

The main-scanning moving mechanism may be a guide only. The supply mechanism may be a tube(s) only or a loading device only.

The "liquid discharge device" includes a head module including the above-described liquid discharge head, and a head device with which the above-described functional components or mechanisms are combined to form a single unit.

The term "liquid discharge apparatus" used herein also represents an apparatus including the head, the liquid discharge device, the head module, or the head device to drive the liquid discharge head to discharge liquid. The liquid discharge apparatus may be, for example, an apparatus capable of discharging liquid to a material onto which liquid can adhere or an apparatus to discharge liquid toward gas or into liquid.

The "liquid discharge apparatus" may further include devices relating to feeding, conveying, and ejecting of the material onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers so as to form a three-dimensional object.

The "liquid discharge apparatus" is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The above-described term "material onto which liquid can adhere" represents a material on which liquid is at least temporarily adhered, a material on which liquid is adhered and fixed, or a material into which liquid is adhered to permeate. Specific examples of the "material onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited.

Examples of the "material onto which liquid can adhere" include any materials to which liquid can adhere even temporarily, such as paper, thread, fiber, fabric, leather, metal, plastic, glass, wood, and ceramic.

The liquid discharge apparatus may be an apparatus to relatively move the liquid discharge head and the material onto which liquid can adhere. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a paper sheet to apply the treatment liquid to the surface of the paper sheet, for reforming the surface of the paper sheet; and an injection granulation apparatus that injects a composition liquid, in which a raw material is dispersed in a solution, through a nozzle to granulate fine particle of the raw material.

The terms "image formation," "recording," "printing," "image printing," and "fabricating" used in the present disclosure may be used synonymously with each other.

As described above, according to the present disclosure, the liquid discharge head maintains the liquid discharging performance more reliably than that of the related art.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:
an actuator substrate including:
a pressure chamber communicating with a nozzle from which a liquid is to be discharged; and
a pressure generator configured to apply pressure to the liquid in the pressure chamber;
a frame bonded to the actuator substrate and having a through hole filled with a resin; and
a temperature detector inserted into the through hole and attached to the actuator substrate with the resin, the temperature detector configured to detect a temperature of the actuator substrate,
wherein the through hole has:
a first face facing the actuator substrate; and
a second face opposite to the first face and facing an opening of the frame,
the resin in the through hole includes:
an uncured portion uncured and facing the first face of the through hole, the uncured portion contacting the actuator substrate; and
a cured portion cured and facing the second face of the through hole, and the uncured portion is between the cured portion and the actuator substrate.

2. The liquid discharge head according to claim 1,
wherein the temperature detector includes:
a temperature measuring device; and
a signal line extending from the temperature measuring device, and
the uncured portion includes:
a first portion enclosing the temperature measuring device; and
a second portion contacting a surface of the actuator substrate and an inner periphery of the through hole adjacent to the surface of the actuator substrate.

3. The liquid discharge head according to claim 1,
wherein a distance between a leading end of the temperature detector and the actuator substrate is in a range of 0 to 2 mm.

4. The liquid discharge head according to claim 1,
wherein the through hole has a tapered cross section, a diameter of which decreases toward the actuator substrate.

5. The liquid discharge head according to claim 1,
wherein the actuator substrate includes a silicon substrate facing the frame.

6. The liquid discharge head according to claim 1,
wherein the uncured portion has a first fluidity, and
the cured portion has a second fluidity smaller than the first fluidity.

7. The liquid discharge head according to claim 1,
wherein the uncured portion has a first hardness, and
the cured portion has a second hardness higher than the first hardness.

8. A liquid discharge device comprising the liquid discharge head according to claim 1.

9. A liquid discharge apparatus comprising the liquid discharge head according to claim 1.

10. A liquid discharge head comprising:
an actuator substrate including:
a pressure chamber communicating with a nozzle from which a liquid is to be discharged; and
a pressure generator configured to apply pressure to the liquid in the pressure chamber:
a frame bonded to the actuator substrate and having a through hole filled with a resin; and
a temperature detector inserted into the through hole and attached to the actuator substrate with the resin, the temperature detector configured to detect a temperature of the actuator substrate,
wherein the through hole has:
a first face facing the actuator substrate; and
a second face opposite to the first face and facing an opening of the frame,
the resin in the through hole includes:
an uncured portion having a first fluidity and facing the first face of the through hole, the uncured portion contacting the actuator substrate; and
a cured portion having a second fluidity smaller than the first fluidity and facing the second face of the through hole, and
the uncured portion is between the cured portion and the actuator substrate.

11. A liquid discharge head comprising:
an actuator substrate including:
a pressure chamber communicating with a nozzle from which a liquid is to be discharged; and
a pressure generator configured to apply pressure to the liquid in the pressure chamber;
a frame bonded to the actuator substrate and having a through hole filled with a resin; and
a temperature detector inserted into the through hole and attached to the actuator substrate with the resin, the temperature detector configured to detect a temperature of the actuator substrate,
wherein the through hole has:
a first face facing the actuator substrate; and
a second face opposite to the first face and facing an opening of the frame,
the resin in the through hole includes:
an uncured portion having a first hardness and facing the first face of the through hole, the uncured portion contacting the actuator substrate; and
a cured portion having a second hardness higher than the first hardness and facing the second face of the through hole, and
the uncured portion is between the cured portion and the actuator substrate.

* * * * *